July 13, 1965 R. D. A. W. DEAN 3,195,055

WAVEFORM RESTORING CIRCUIT FOR STEEPENING FRONT AND REAR EDGES AND FLATTENING THE TOP OF SIGNAL

Filed Sept. 17, 1962 2 Sheets-Sheet 1

United States Patent Office 3,195,055
Patented July 13, 1965

3,195,055

WAVEFORM RESTORING CIRCUIT FOR STEEPENING FRONT AND REAR EDGES AND FLATTENING THE TOP OF SIGNAL

Reginald Douglas Albert William Dean, Beckenham, Kent, England, assignor to Muirhead & Co. Limited, Beckenham, England Filed Sept. 17, 1962, Ser. No. 223,874
Claims priority, application Great Britain, Aug. 24, 1962, 32,665/62
6 Claims. (Cl. 328—162)

The present invention relates to electrical circuits for restoring the original wave shape of electric waves having relatively steep edges when such electric waves have been transmitted over a circuit having limited pass-bands.

The transmission over circuits having limited pass-bands of waveforms having relatively steep edges, for example, square waves and the like, is marred by the distributed and lumped constants in transmission line and filters respectively, resulting in delay distortion and other undesirable effects. Despite advanced filter design and the use of vestigial sideband techniques to preserve the original wave shape, the final demodulated waveform is often mutilated to an extent that at least limits its usefulness.

It is an object of the invention to flatten or level the top and steepen the back (negative going) edge of a substantially rectangular waveform.

It is a further object to steepen the front (positive going) edge of said waveform.

It is a still further object to provide correction of the waveform that is substantially constant over a wide range of signal levels.

The invention consists in a circuit arrangement for steepening the edge of an electric signal, comprising means for deriving from the signal a pulse having a steeper edge and means for using the steeper edges of said pulse for steepening the edge of the signal.

Conveniently the input signal to be restored is divided into two signals, one being at a higher level than the other. The signal at the lower level is fed to the anode of a diode, the cathode of which is connected in series with a capacitor so that the capacitor is charged to the peak potential of the signal, the signal at the higher level is fed to the cathode of a furher diode, the anode of which is also connected to the aforesaid capacitor. The voltage at the cathode of the second diode plays no part until the back edge of the waveform is reached. As, at this point, the level of the cathode falls below that existing across the capacitor, it carries the potential of the capacitor with it, thereby steepening the back edge of the waveform in accordance with the ratio of the two signal levels.

Conveniently the ratio of the two levels is adjustable.

At this stage the waveform has a substantially flat top and an improved rear edge. Further improvement is desired by steepening the front edge and flattening the bottom of the waveform. To achieve this, the signal so far improved, is amplified and fed to a differentiating circuit, where pulses corresponding to the front and rear edges are generated but the positive pulse corresponding to the rear edge is suppressed. The remaining negative pulse is amplified and combined with the signal thereby effectively steepening the front edge thereof. Finally, the bottom of the waveform is flattened and other undesirable signal components are removed by simple diode limiting.

In order that the invention may be more clearly understood, an embodiment thereof will now be described by way of example with reference to the accompanying drawings in which.

Figure 3:
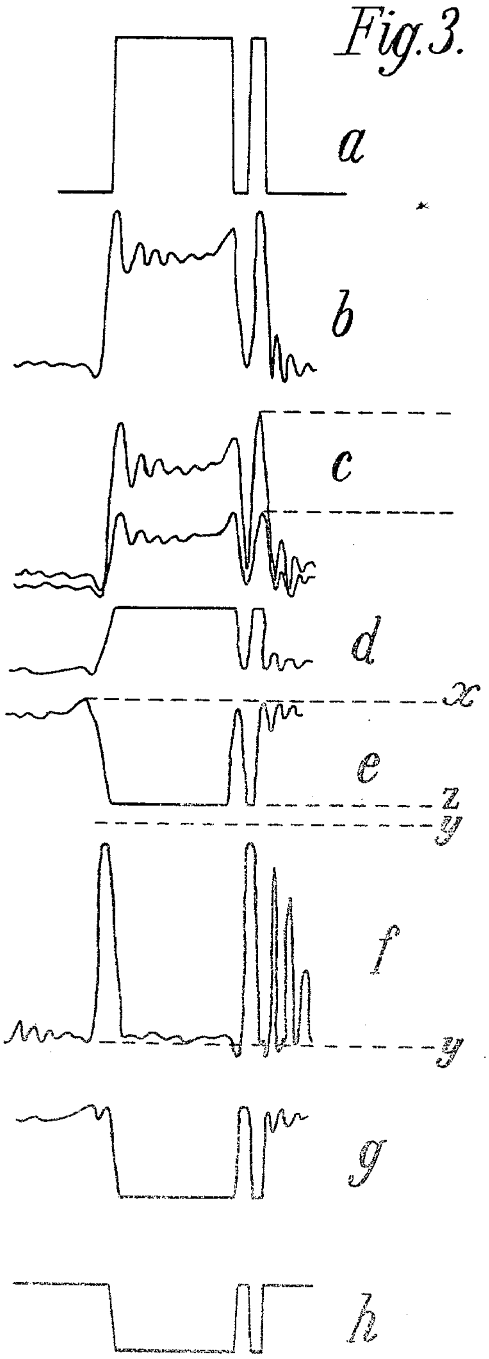

FIGURE 3(*a*) to FIGURE 3(*h*) show the waveforms appearing in various parts of the circuit.

Figures 1, 2:
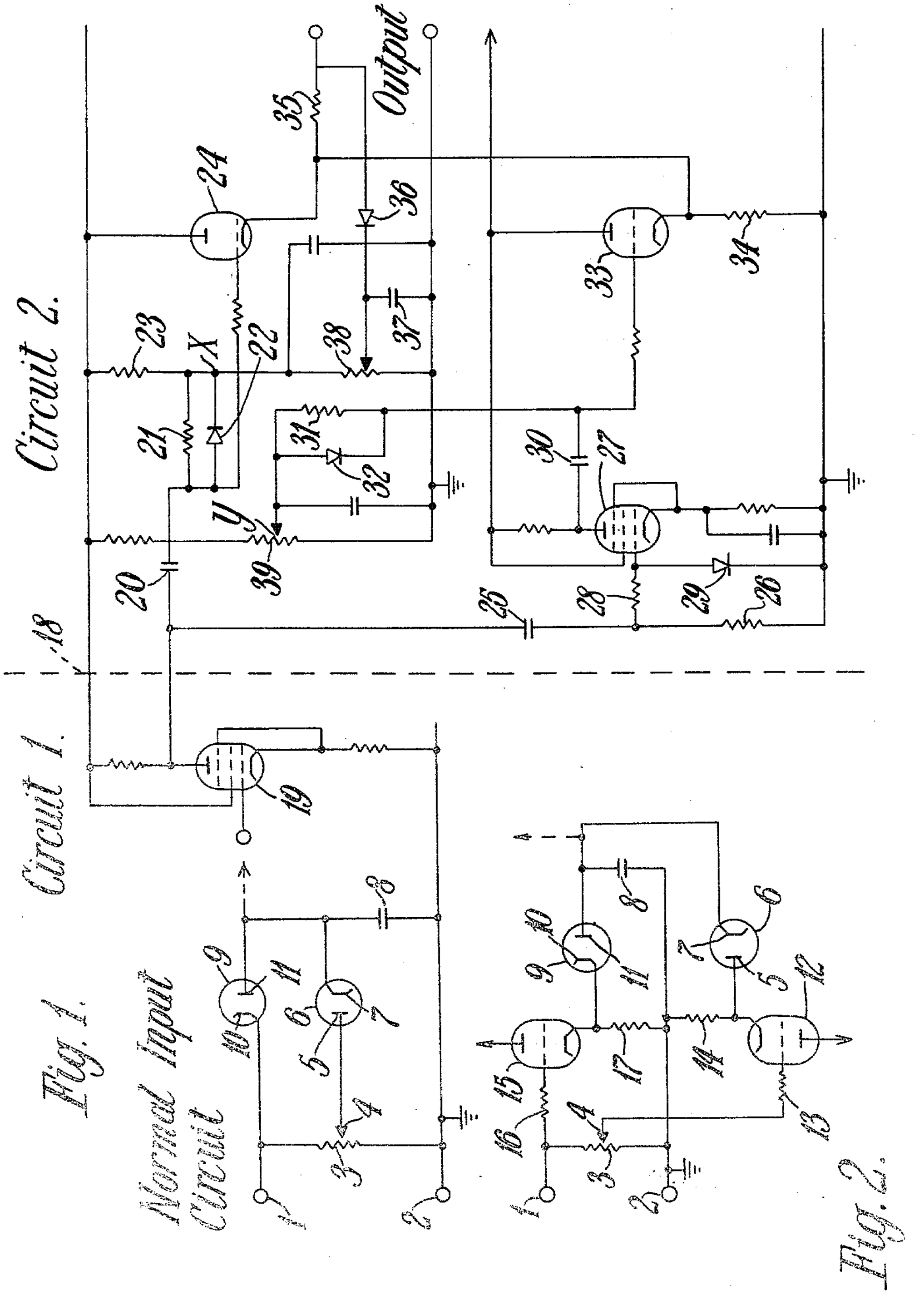
FIGURE 1 is a diagram of the circuit according to the invention.
FIGURE 2 is a diagram of an alternative input circuit.

Referring now to FIGURES 1 and 3, the signal shown at (*a*) in FIGURE 3 is typical of a waveform having steep front and rear slopes and is characteristic of the modulation signal generated in, for example, a fascimile transmitter for purely black and white subjects. The signal shown at (*b*) in FIGURE 3 is the demodulated signal at the receiver and exhibits the characteristic distortion which it is desired to correct. In FIGURE 1 the waveform (FIG. 3(*b*)) is applied over input terminals 1 and 2 to potential divider 3, terminal 2 being at earth potential. Slider 4 of potential divider 3 selects a convenient level of the input signal and passes it to anode 5 of thermionic diode 6, the cathode 7 of which is connected to one side of capacitor 8. The other side of capacitor 8 is returned to the earth side of potential divider 3. Thermionic diode 9 accepts the full input signal potential on cathode 10 while anode 11 is connected to the junction of cathode 7 of diode 6 and capacitor 8.

The capacitor 8 is charged via diode 6 to the peak value of the signal which is held sensibly constant until the arrival of the rear edge. Diode 9 plays no part until the rear edge of its applied waveform is reached. As the level of cathode 10 of diode 9 falls below that on capacitor 8 it carries the potential of capacitor 8 with it. Reference to FIGURE 3(*d*) shows that the rear edge has been steepened in accordance with the ratio of the potential divider 3 and, because the charge on capacitor 8 is constant, the top of the waveform will be correspondingly flat and remain so for all levels of the input signal. This feature cannot be achieved by conventional limiters.

The purpose of capacitor 8 is to minimize the effects of the inherent anode-to-cathode capacitance of diodes 6 and 9. If these diodes had no self-capacitance, the charge and discharge of stray capacitances would then serve the circuit function. The resistance of potential divider 3 must be low enough to provide current for capacitor 8 without appreciable loading. Where this is not possible, diodes 6 and 9 may be fed from amplifiers connected in cathode follower configuration as shown in FIGURE 2 which shows a modified input circuit for circuit 1 of FIGURE 1. In the figure, in which like parts are indicated by like references where applicable, the signal potential selected by slider 4 of potential divider 3 is applied to the grid of amplifier 12 over grid stopper resistor 13, the input to diode 6 being taken from the cathode end of cathode resistor 14. Similarly, the full input signal is fed to the grid of amplifier over grid stopper resistor 16, the input to diode 9 being taken from the cathode end of cathode resistor 17.

The part of the circuit so far described and designated CIRCUIT 1 and shown in FIGURE 1 to the left of broken line 18, serves to restore the flat top and steepen the slope of the rear edge of the waveform.

That part of the circuit to the right of the broken line now to be described and designated CIRCUIT 2 serves to still further restore the distorted waveform by steepening the front edge and removing the irregularities in the bottom of the wave. It functions as follows:

The waveform (FIGURE 3(*d*)) from the anode 11 of diode 9 is fed to the grid of amplifier 19 which conveniently may be a pentode tube. The output of amplifier 19 is D.C. restored or clamped negatively to the point of positive potential "*x*" by the combination comprising capacitor 20, resistor 21 and diode 22. Negative clamping is required at this stage because the signal has been inverted in amplifier 19 and is now negative-going. The amplified and clamped signal is fed to the grid of cathode follower amplifier 24 producing a signal of maximum amplitude "z" (FIGURE 3 (*e*)).

The waveform appearing at the anode of amplifier 19 is also differentiated by capacitor 25 and resistor 26, and the negative pulses resulting from the front edge of the primary waveform and ringing pulses, or pulses caused by incidental resonances in the transmission system are applied to the grid of high gain amplifier 27 which conveniently may also be a pentode tube. The positive pulses are removed by the combination comprising resistor 28 and diode 29. The output from amplifier 27 anode which is now positive-going is D.C. restored or clamped positively to the point "y" negative to "z" (FIGURE 3(*e*)) by the combination comprising capacitor 30, resistor 31 and diode 32 and fed to the grid of amplifier 33 connected in cathode follower configuration. The point "y" may be varied with respect to point "z" by adjusting the slider of potentiometer 39. The voltage appearing at the grid of amplifier 33 is shown in FIGURE 3(*f*). The waveform appearing across the cathode resistor 34 common to amplifiers 24 and 33 is shown in FIGURE 3(*g*).

The connection of cathode followers in this manner does not constitute mixing, either additive or multiplicative, since the valve whose grid is the more positive will tend to overbias the other.

Normally amplifier 33 is cut off by amplifier 24. Positive pulses on the grid of amplifier 33, occurring as the grid of amplifier 24 starts to fall, reverse the condition and the front edge of the main waveform is replaced by a delayed steepened version, due to the back edge of the grid waveform of amplifier 33 (see FIGURE 3(*f*)).

Ringing pulse peaks from amplifier 33, which appear at the common cathode point, are not undesirable as they tend to reduce the ringing content of the main waveform and occur at a level above the final limiting threshold.

The D.C. restoration level "y" may be varied by potentiometer 39 so that optimum correction may be effected for various waveforms. The bottom of the waveform is now flattened by simple diode limiting by the combination comprising resistor 35, diode 36 and capacitor 37, the threshold being set by potentiometer 38.

The irregularities in the bottom of the waveform that are lost by diode limiting should not normally exceed 20 percent of the total amplitude, and amplitude expansion of this part of the waveform at the transmitter could reduce the loss.

In general the steepness of the front edge depends on the gain of amplifier 27 and that of the rear edge on the ratio of potential division in potential divider 3.

The circuits above described are suitable for the correction of positive waveforms of which the minimum is constant and at zero level and of which the maximum may vary, or for other waveforms which may be made to conform to the above requirement by known means. For example, a waveform in which the minimum is positive and the maximum is negative may be made to conform to the above requirement by inverting the phase and appropriately shifting the level of the signal.

The invention is especially suitable to black-white facsimile signals as these may already exhibit poor edges due to aperture distortion at the transmitter and a relatively constant white level. The aperture distortion remains, even supposing perfect transmission, and it is greatly reduced by the use of the invention.

It will be understood that no restriction is made to the particular forms of embodiment and details of construction illustrated in the drawings which are quoted merely by way of example and that numerous modifications are quite possible within the meaning of the above description.

I claim:

1. A circuit arrangement for steepening the edges and flattening the top of an electric signal having a front and a rear edge comprising means for deriving a higher level and a lower level signal from the input signal in relation to a common potential, a diode having an anode and a cathode, means for supplying the lower level signal to the anode of the diode, a capacitor connecting the cathode back to the common potential, a second diode having an anode and a cathode, means for supplying the higher level signal to the cathode of the second diode, the anode of which is connected through the capacitor to the common potential to flatten the top and steepen the rear edge of the signal, means for amplifying the waveform derived from the capacitor, means for differentiating the output of the amplifying means to provide a pulse from the front edge of the signal, means for amplifying the said pulse and means for combining the amplified pulse with the amplified signal to steepen the front edge thereof.

2. A circuit arrangement as claimed in claim 1, in which the means for combining the amplified pulse with the first derived signal comprising cathode follower circuits respectively fed with the first derived signal and the amplified pulse, and a common output impedance in the cathode follower circuits.

3. A circuit arrangement as claimed in claim 2, comprising means connected in the input of the respective cathode follower circuit by which said first derived signal is clamped negatively.

4. A circuit arrangement as claimed in claim 2, comprising means connected in the input of the respective cathode follower circuit by which said amplified pulse is clamped positively.

5. A circuit arrangement as claimed in claim 4, comprising a diode limiter in the output circuit of the cathode follower associated with the first derived signal and operative to flatten the bottom of the signal waveform.

6. A circuit arrangement as claimed in claim 1, comprising means connected in the input of the amplifying means for removing the positive pulses resulting from the differentiation of the second derived signal.

References Cited by the Examiner

UNITED STATES PATENTS 2,560,167 7/51 Glenn ---------------- 328—164

OTHER REFERENCES

Pub. II, "Pulse-Sharpening Device" in IBM Tech. Disclosure Bulletin, vol. 2, No. 4, dated December 1959, pages 75–76.

Pub. I, "Waveform Shaping Circuit" in IBM Tech. Disclosure Bulletin, vol. 2, No. 4, dated December 1959, page 88.

ARTHUR GAUSS, *Primary Examiner.*